(12) United States Patent
Song et al.

(10) Patent No.: US 11,239,456 B2
(45) Date of Patent: Feb. 1, 2022

(54) COMPOSITE CATHODE ACTIVE MATERIAL, AND CATHODE AND LITHIUM BATTERY COMPRISING COMPOSITE CATHODE ACTIVE MATERIAL

(71) Applicant: Samsung SDI Co., Ltd., Yongin-si (KR)

(72) Inventors: Yumi Song, Yongin-si (KR); Seonyoung Kwon, Yongin-si (KR); Kihyun Kim, Yongin-si (KR); Soohyeon Kim, Yongin-si (KR); Jinhwa Kim, Yongin-si (KR); Joongho Moon, Yongin-si (KR); Jaeho Lee, Yongin-si (KR); Kwanghwan Cho, Yongin-si (KR); Soonbong Choi, Yongin-si (KR); Mingzi Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/663,105

(22) Filed: Oct. 24, 2019

(65) Prior Publication Data
US 2020/0058925 A1 Feb. 20, 2020

Related U.S. Application Data

(63) Continuation of application No. 15/824,829, filed on Nov. 28, 2017, now Pat. No. 11,075,367.

(30) Foreign Application Priority Data

Nov. 30, 2016 (KR) ........................ 10-2016-0162294

(51) Int. Cl.
  *H01M 4/131* (2010.01)
  *H01M 4/133* (2010.01)
  (Continued)

(52) U.S. Cl.
  CPC .......... *H01M 4/131* (2013.01); *H01M 4/133* (2013.01); *H01M 4/366* (2013.01); *H01M 4/485* (2013.01);
  (Continued)

(58) Field of Classification Search
  CPC .................................................... H01M 4/131
  See application file for complete search history.

(56) References Cited

U.S. PATENT DOCUMENTS 9,601,765 B2    3/2017  Cho et al.
2003/0087160 A1*  5/2003  Suzuki .............. H01M 10/0525
                                                      429/327

(Continued)

FOREIGN PATENT DOCUMENTS

KR  10-2006-0109305 A  10/2006
KR  10-2013-0090658 A   8/2013

(Continued)

OTHER PUBLICATIONS

Definition nonaqueous (Year: 2021).*

(Continued)

*Primary Examiner* — Brian R Ohara
(74) *Attorney, Agent, or Firm* — Lewis Roca Rothgerber Christie LLP

(57) ABSTRACT

A composite cathode active material, a cathode including the composite cathode active material, and a lithium battery including the cathode are provided. The composite cathode active material includes a core including a lithium metal oxide and a coating layer on the core, wherein the lithium metal oxide includes two or more transition metals including nickel (Ni), an amount of Ni within one mole of the two or more transition metals included in the lithium metal oxide is (Continued)

about 0.65 mol or greater, the coating layer includes LiF, and a resistance of the composite cathode active material is lower than that of the core.

23 Claims, 4 Drawing Sheets

(51) Int. Cl.
| | |
|---|---|
| *H01M 4/36* | (2006.01) |
| *H01M 4/485* | (2010.01) |
| *H01M 4/505* | (2010.01) |
| *H01M 4/525* | (2010.01) |
| *H01M 4/66* | (2006.01) |
| *H01M 10/052* | (2010.01) |
| *H01M 10/0525* | (2010.01) |
| *H01M 4/02* | (2006.01) |
| *C01B 32/22* | (2017.01) |

(52) U.S. Cl.
CPC ........... *H01M 4/505* (2013.01); *H01M 4/525* (2013.01); *H01M 4/665* (2013.01); *H01M 10/052* (2013.01); *H01M 10/0525* (2013.01); *C01B 32/22* (2017.08); *H01M 2004/028* (2013.01); *Y02T 10/70* (2013.01)

(56) References Cited

U.S. PATENT DOCUMENTS

| | | | | |
|---|---|---|---|---|
| 2007/0202394 A1* | 8/2007 | Viavattine | ........... | H01M 50/449 429/144 |
| 2009/0087362 A1* | 4/2009 | Sun | ........... | H01M 4/505 423/179.5 |
| 2011/0177391 A1 | 7/2011 | Ookita et al. | | |
| 2011/0318651 A1* | 12/2011 | Leitner | ........... | H01M 4/13 429/320 |
| 2014/0199475 A1 | 7/2014 | Tonegawa et al. | | |
| 2014/0363741 A1* | 12/2014 | Lee | ........... | H01M 4/0495 429/231.95 |
| 2015/0044552 A1* | 2/2015 | Okita | ........... | H01M 10/052 429/188 |
| 2015/0194662 A1 | 7/2015 | Yang et al. | | |
| 2015/0228970 A1* | 8/2015 | Song | ........... | H01M 10/052 429/220 |
| 2015/0243971 A1* | 8/2015 | Cho | ........... | H01M 4/131 429/223 |
| 2015/0295241 A1 | 10/2015 | Liang et al. | | |
| 2016/0020459 A1 | 1/2016 | Nishide et al. | | |

FOREIGN PATENT DOCUMENTS

| | | |
|---|---|---|
| KR | 10-2013-0098928 A | 9/2013 |
| KR | 10-2015-0082084 A | 7/2015 |
| KR | 10-2015-0100406 A | 9/2015 |
| WO | WO 2006/109930 A1 | 10/2006 |

OTHER PUBLICATIONS

Carbonize definitions (Year: 2020).
U.S. Office Action dated May 18, 2020, issued in U.S. Appl. No. 15/824,829 (17 pages).
U.S. Notice of Allowance dated Nov. 4, 2020, issued in U.S. Appl. No. 15/824,829 (8 pages).
Final Office Action dated Jan. 28, 2020, issued in U.S. Appl. No. 15/824,829 (15 pages).
U.S. Advisory Action dated Apr. 6, 2020, issued in U.S. Appl. No. 15/824,829 (4 pages).
U.S. Final Office Action dated Aug. 24, 2020, issued in U.S. Appl. No. 15/824,829 (15 pages).
U.S. Notice of Allowance dated Apr. 2, 2021, issued in U.S. Appl. No. 15/824,829 (7 pages).
Korean Notice of Allowance dated Sep. 6, 2021, issued in corresponding Korean Patent Application No. 10-2016-0162294 (2 pages).

\* cited by examiner

COMPOSITE CATHODE ACTIVE MATERIAL, AND CATHODE AND LITHIUM BATTERY COMPRISING COMPOSITE CATHODE ACTIVE MATERIAL

CROSS-REFERENCE TO RELATED APPLICATION

This application is a continuation of U.S. patent application Ser. No. 15/824,829, filed on Nov. 28, 2017, which claims priority to and the benefit of Korean Patent Application No. 10-2016-0162294, filed on Nov. 30, 2016, in the Korean Intellectual Property Office, the entire content of both of which is incorporated herein by reference.

BACKGROUND

1. Field

One or more aspects of example embodiments of the present disclosure relate to a composite cathode active material, and a cathode and a lithium battery including the composite cathode active material.

2. Description of the Related Art

Lithium secondary batteries having high voltages and high energy densities are applicable to various uses. For example, lithium secondary batteries may be applied in electric vehicles, for example, hybrid electric vehicles (HEVs) and/or plug-in hybrid electric vehicles (PHEVs). When the lithium secondary battery needs to be operated at a high temperature, charged/discharged with a large amount of electricity (e.g., capacity), and/or used for a long time, excellent discharge capacity and lifespan characteristics are desirable.

$LiCoO_2$ is used as a lithium battery cathode active material, but improved cathode active materials that provide increased battery capacity are desired.

In order to increase a capacity of a cathode active material, a cathode active material having an increased amount of nickel (Ni) may be used. The cathode active material having an increased amount of Ni may be calcined at a low temperature. At these lower temperatures, an increased amount of residual lithium (Li) in the form of $Li_2CO_3$ and/or LiOH may be present on a surface of the cathode active material, and the stability of a lithium battery including the cathode active material may be decreased. When the cathode active material is rinsed to reduce the amount of Li on the surface of the cathode active material, lithium inside the cathode active material may leak out, and thus, charge/discharge characteristics may be deteriorated.

Therefore, a lithium battery providing improved charge/discharge characteristics and high-temperature stability by including a cathode active material having a low amount of residual surface lithium and suppressed deterioration of charge/discharge characteristics is desired.

SUMMARY

One or more aspects of example embodiments of the present disclosure are directed toward a novel composite cathode active material.

One or more aspects of example embodiments of the present disclosure are directed toward a cathode including the composite cathode active material.

One or more aspects of example embodiments of the present disclosure are directed toward a lithium battery including the composite cathode active material.

Additional aspects will be set forth in part in the description which follows and, in part, will be apparent from the description, or may be learned by practice of the presented embodiments.

According to one or more embodiments of the present disclosure, a composite cathode active material includes a core including a lithium metal oxide; and a coating layer on the core, wherein an amount of Ni among two or more transition metals included in the lithium metal oxide is about 0.65 mol or greater, the coating layer includes LiF, and a resistance of the composite cathode active material is lower than that of the core.

According to one or more embodiments of the present disclosure, a cathode includes the composite cathode active material.

According to one or more embodiments of the present disclosure, a lithium battery includes the cathode (e.g., the composite cathode active material).

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
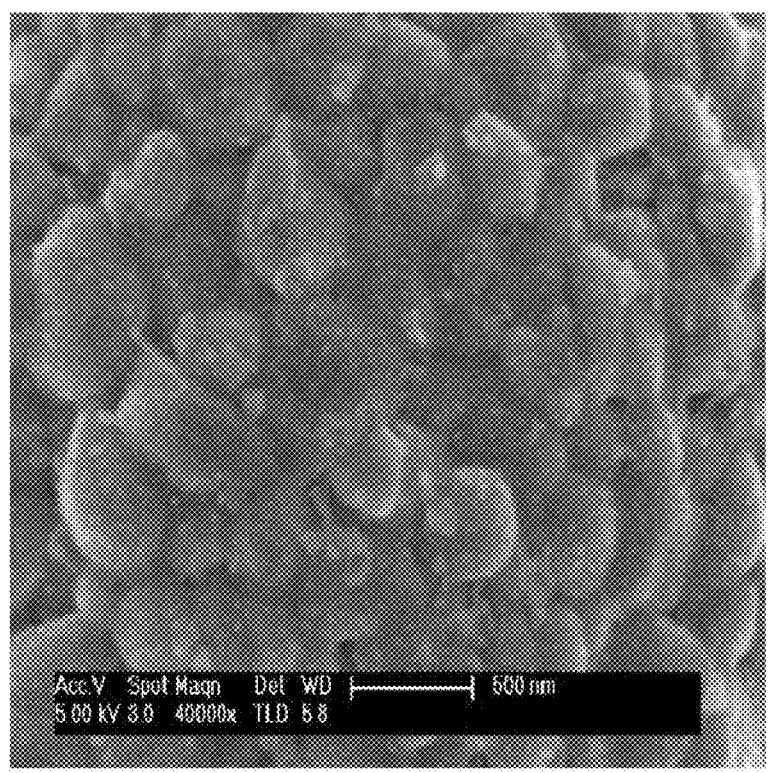
FIG. 1 is a scanning electronic microscope (SEM) image of a surface of a composite cathode active material prepared according to Example 1.

Reference will now be made in more detail to example embodiments, examples of which are illustrated in the accompanying drawings, wherein like reference numerals refer to like elements throughout and duplicative descriptions thereof may not be provided. In this regard, the present embodiments may have different forms and should not be construed as being limited to the descriptions set forth herein. Accordingly, the example embodiments are merely described herein, by referring to the drawings, to explain aspects of the present description. As used herein, the term "and/or" includes any and all combinations of one or more of the associated listed items. Expressions such as "at least one of", "one of", and "selected from", when preceding a list of elements, modify the entire list of elements and do not modify the individual elements of the list.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Hereinafter, according to one or more embodiments of the present disclosure, a composite cathode active material, a cathode, and a lithium battery will be described.

According to one or more embodiments of the present disclosure, a composite cathode active material includes a core including a lithium metal oxide and a coating layer on the core (e.g., radially surrounding the core), wherein the lithium metal oxide includes two or more transition metals including nickel (Ni), and an amount of Ni included in 1 mol of the two or more transition metals included in the lithium metal oxide is 0.65 mol or greater (e.g., the Ni may be included in an amount of about 0.65 molar equivalents or greater). The coating layer may include LiF, and a resistance of the composite cathode active material (e.g., as a whole) may be lower than that of the core. Regarding the composite cathode active material, since a coating layer including LiF is added onto (e.g., deposited on) a lithium metal oxide core, side reactions with respect to an electrolyte solution (e.g., between the active material and the electrolyte solution) may be slowed and/or decreased, and the stability of the composite cathode active material may be improved. In addition, although the coating layer including LiF is on the lithium metal oxide core, the resistance of the composite cathode active material (e.g., as a whole) is lower than that of the lithium metal oxide core (e.g., the uncoated lithium metal oxide core), and thus, charge/discharge characteristics and high-temperature storage characteristics of the lithium battery including the composite cathode active material may be improved. FIG. 1 is a scanning electronic microscope (SEM) image showing the coating layer including LiF on the surface of a lithium metal oxide core in a composite cathode active material prepared according to Example 1.

In some embodiments, the coating layer of the composite cathode active material may have an X-ray photoelectric spectroscopy (XPS) peak associated with electron emission from an fluorine (F) 1s orbital, where the energy of the peak is at about 684 eV to about 685 eV in an XPS spectrum. The peak may be derived (e.g., may arise) from the coating layer including LiF.

The amount of Ni included in 1 mol (e.g., molar equivalent) of transition metals included in the lithium metal oxide may be about 0.65 mol to about 0.99 mol (e.g., Ni may be included in an amount of 65 mol % to 99 mol % based on the total amount of transition metals). In some embodiments, the amount of Ni included in 1 mol of transition metals included in the lithium metal oxide may be about 0.70 to about 0.99 mol. In some embodiments, the amount of Ni included in 1 mol of transition metals included in the lithium metal oxide may be about 0.75 mol to about 0.99 mol. When the lithium metal oxide includes the above-described amounts of Ni, the discharge capacity of the composite cathode active material may be increased.

In some embodiments, the coating layer of the composite cathode active material may further include a carbonaceous material. When the coating layer includes a carbonaceous material having excellent conductivity, the resistance of the composite cathode active material may decrease. The type or kind of carbonaceous material is not particularly limited, and any suitable conductive carbonaceous material available in the art may be used. Non-limiting examples of the carbonaceous material included in the coating layer may include a calcined product of an organic compound precursor, acetylene black, Ketjenblack, carbon black, petroleum-based pitch carbide, coal-based pitch carbide, and carbon fibers.

In some embodiments, the coating layer of the composite cathode active material may include amorphous carbon. For example, the coating layer may include low-crystalline or amorphous carbon. In some embodiments, the low-crystalline or amorphous carbon may have a plane spacing $d_{002}$ of about 3.45 Å or greater, and in some embodiments, may have no character peak in an XRD spectrum (e.g., may be distinguished by the absence of an XRD peak). When the coating layer has high crystallinity and/or includes graphite, one or more side reactions may occur between the electrolyte solution and a surface of the coating layer. When the coating layer includes low-crystalline or amorphous carbon, side reactions between the carbonaceous coating layer and the electrolyte solution during charging/discharging may be suppressed, and thus, the charge/discharge characteristics of a battery including the composite cathode active material according to embodiments of the present disclosure may be improved.

In some embodiments, the coating layer of the composite cathode active material may be a composite layer that includes both LiF and a carbonaceous material (e.g., simultaneously). For example, the coating layer may have a single-layer structure that includes both LiF and a carbonaceous material in one (e.g., the same) layer. The coating layer may have a composition including LiF and a carbonaceous material, and the composition materials may be homogenously or non-homogenously mixed therein. In some embodiments, the coating layer may have a multi-layer structure that includes a first coating layer including LiF and a second coating layer including a carbonaceous material.

In some embodiments, the coating layer of the composite cathode active material may be discontinuously disposed in the shape of an island on the core (e.g., may have the form or shape of a series of discontinuous and separated island shapes on the surface of the core). When the coating layer is selectively disposed on a defect part on the core, elution of a transition metal that mainly occurs at the defect on the core may be suppressed, and a side reaction between a transition metal oxide and the electrolyte solution may be suppressed (e.g., the coating layer may reduce or decrease elution or leaching of transition metal ions from defects in the underlying core, thereby suppressing transition metal oxide-forming side reactions between the electrolyte and the transition metal ions). Also, since the core is partially coated by the coating layer, a resistance increase of the composite cathode active material may be suppressed or reduced. The coating layer may serve as a protection (e.g., protective) layer of the core.

In some embodiments, the coating layer of the composite cathode active material may be continuously disposed on the core (e.g., may have the shape or form of a continuous layer), and may thus completely cover the core. When the coating layer completely covers the core, side reactions between the core (e.g., the material forming the core) and the electrolyte solution as well as elution of a transition metal from the core may be effectively suppressed or reduced.

In some embodiments, a thickness of the coating layer of the composite cathode active material may be about 2 nm to about 500 nm. For example, a thickness of the coating layer may be about 2 nm to about 300 nm. For example, a thickness of the coating layer may be about 2 nm to about 100 nm. For example, a thickness of the coating layer may be about 2 nm to about 50 nm. When the thickness of the coating layer is within these ranges, a resistance increase of the composite cathode active material may be suppressed or reduced, while side reactions between the core (e.g., the material forming the core) and the electrolyte solution may be prevented or reduced.

In the composite cathode active material, a thickness of the second coating layer may be about 1 nm to about 100 nm. For example, a thickness of the second coating layer may be about 2 nm to about 70 nm. For example, a thickness of the second coating layer may be about 2 nm to about 50 nm. For example, a thickness of the second coating layer may be about 2 nm to about 30 nm. For example, a thickness of the second coating layer may be about 2 nm to about 20 nm. For example, a thickness of the second coating layer may be about 2 nm to about 10 nm. When the thickness of the second coating layer is within these ranges, a resistance increase of the composite cathode active material may be suppressed or reduced, while a side reaction between the core and an electrolyte solution may be prevented or reduced.

In some embodiments, the coating layer of the composite cathode active material may be a product of a reaction between a lithium metal oxide and a mixed solution including alcohol and an electrolyte solution. The coating layer including LiF may be a product of a reaction that occurs when the mixed solution including alcohol and an electrolyte solution comes into contact with particles of the lithium metal oxide. For example, the coating layer including LiF may be a product of a reaction obtained by washing particles of the lithium metal oxide with the mixed solution including alcohol and an electrolyte solution.

An amount of alcohol substantially included in the mixed solution may be about 99% or more. In some embodiments, the alcohol may include a trace amount of water, however, water may not be intentionally added thereto. The alcohol may be a linear or branched $C_1$-$C_{10}$ alcohol, but embodiments of the present disclosure are not limited thereto, and any suitable alcohol may be used. For example, the alcohol may be or include methanol, ethanol, propanol, and/or butanol.

The electrolyte solution included in the mixed solution may include a fluorine-containing lithium salt and a non-aqueous solvent. The fluorine-containing lithium salt may be any suitable lithium salt available for electrolytes in the art. For example, the lithium salt may be or include $LiPF_6$, $LiBF_4$, $LiSbF_6$, $LiAsF_6$, or a mixture thereof. An amount of the lithium salt is not particularly limited and may be any suitable concentration or amount used in lithium battery electrolyte solutions in the art. For example, an amount of the lithium salt in the mixture solution may be about 0.1 M to about 10 M. The non-aqueous solvent may be any suitable non-aqueous solvent available for electrolyte solutions in the art. For example, the non-aqueous solvent may be or include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In this regard, since the mixed solution including alcohol and an electrolyte solution is substantially a non-aqueous solution, residual lithium from $Li_2CO_3$ or LiOH may be removed (e.g., from the surface of the composite cathode active material) as effectively as in the case of washing a lithium metal oxide particle with water. However, in contrast to the case of washing a lithium metal oxide particle with water, the side effect of eluting lithium ions from the lithium metal oxide composition (e.g., from the core) may be prevented or reduced. When lithium ions are eluted from the lithium metal oxide composition, the capacity of the composite cathode active material may decrease and the surface resistance of the lithium metal oxide (e.g., the composite cathode active material) may increase.

In some embodiments, the coating layer of the composite cathode active material may be prepared by mixing a lithium metal oxide and the mixed solution including alcohol and the electrolyte solution to form a mixture, and then drying the mixture. For example, lithium metal oxide powder may be added to the mixed solution including alcohol and the electrolyte solution, and the resultant mixture may be mixed by stirring, thus removing residual lithium on the surface of the lithium metal oxide. Then, the lithium metal oxide powder may be taken out of (e.g., separated from) the mixture and dried to prepare the coating layer.

The mixture including alcohol, the electrolyte solution, and the lithium metal oxide may be mixed at a temperature of about 10° C. to about 70° C. When the temperature is within this range, production of LiF from the lithium salt may be promoted, which may ultimately result in promoting generation of HF, and thus, the coating layer including LiF may be effectively obtained.

Although a mechanism of preparing the coating layer including LiF will be described in more detail in this specification, the description is provided to assist understanding of the present disclosure, and is not intended to limit the scope of the present disclosure for any reason.

In some embodiments, for example, $LiPF_6$ (e.g., from the electrolyte) may be dissociated into LiF and $PF_5$ in the mixed solution at a temperature of about 60° C. The $PF_5$ may react with a trace amount of residual water in alcohol and thus be dissociated into $PF_3O$ and HF. The HF thus produced may react with residual $Li_2CO_3$ and LiOH on a surface of the lithium metal oxide (e.g., the core), resulting in dissociation and removal of $Li_2CO_3$ and LiOH. In some embodiments, HF may react with LiOH, thus forming a LiF coating layer. Although $H_2O$ may be produced during this process (reaction), the amount of $H_2O$ should be very low, and thus elution of lithium in the lithium metal oxide composition may be suppressed or reduced.

In some embodiments, the coating layer of the composite cathode active material may be prepared by mixing a lithium metal oxide and a mixed solution including alcohol and an electrolyte to form a mixture, drying the mixture, and heat-treating the mixture. For example, a heat-treating process may be additionally performed after the drying. As a result of the heat-treating process, the coating layer comprising a carbonaceous material that is prepared by carbonizing an organic material remaining in the lithium metal oxide may be additionally formed.

The heat-treating process may be performed at a temperature of about 400° C. to about 800° C., but embodiments of the present disclosure are not limited thereto, and any suitable temperature may be used as long as the carbonaceous material is formed in the coating layer on the surface of the lithium metal oxide physical properties of the composite cathode active material are not deteriorated at the temperature. For example, the heat-treating process may be performed at a temperature of about 500° C. to about 800° C. For example, the heat-treating process may be performed at a temperature of about 600° C. to about 800° C. For example, the heat-treating process may be performed at a temperature of about 650° C. to about 750° C. The heat-treating process may be performed under an air or oxygen atmosphere. The heat-treating time (e.g., duration of the heat-treating process) may be about 1 hour to about 15 hours. For example, a heat-treating time may be about 1 hour to about 10 hours. For example, a heat-treating time may be about 1 hour to about 5 hours. For example, a heat-treating time may be about 2 hours to about 4 hours.

In the composite cathode active material, the lithium metal oxide may be represented by Formula 1:

$$Li_{1+a}[Ni_{1-x}M_x]O_{2-b}X_b \qquad \text{Formula 1}$$

wherein $0 \leq a \leq 0.2$, $0.01 \leq b \leq 0.1$, $0.01 \leq x \leq 0.35$, M is at least one selected from aluminum (Al), cobalt (Co), manganese (Mn), magnesium (Mg), zinc (Zn), iron (Fe), chromium (Cr), gallium (Ga), molybdenum (Mo), tungsten (W), titanium (Ti), scandium (Sc), vanadium (V), boron (B), silicon (Si), germanium (Ge), arsenic (As), zirconium (Zr), ruthenium (Ru), rhodium (Rh), platinum (Pt), silver (Ag), and tin (Sn), and X is fluorine (F) or sulfur (S).

For example, in the composite cathode active material, the lithium metal oxide may be represented by Formula 2:

$$Li_{1+a}[Ni_{1-x-y}Co_xM'_y]O_{2-b}X_b \qquad \text{Formula 2}$$

wherein $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$, M is at least one selected from Al, Mn, Mg, Zn, Fe, Cr, Ga, Mo, W, Ti, Sc, V, B, Si, Ge, As, Zr, Ru, Rh, Pt, Ag, and Sn, and X is F or S.

For example, in the composite cathode active material, the lithium metal oxide may be represented by one of Formulae 3 to 6:

$$Li_{1+a}[Ni_{1-x-y}Co_xMn_y]O_{2-b}X_b \qquad \text{Formula 3}$$

wherein $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$, and X is F or S;

$$Li_{1+a}[Ni_{1-x-y}Co_xAl_y]O_{2-b}X_b \qquad \text{Formula 4}$$

wherein $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$, and X is F or S;

$$Li_{1+a}[Ni_{1-x-y-z}Co_xMn_yAl_z]O_{2-b}X_b \qquad \text{Formula 5}$$

wherein $0 \leq a \leq 0.2$, $0.01 \leq b \leq 0.1$, $0.01 \leq x \leq 0.35$, $0.01 \leq y \leq 0.35$, $0.01 \leq z \leq 0.35$, $0.65 \leq 1-x-y-z \leq 0.95$, and X is F or S;

$$Li_{1+a}[Ni_{1-x-y-z-v}Co_xMn_yAl_zMg_v]O_{2-b}X_b \qquad \text{Formula 6}$$

wherein $0 \leq a \leq 0.2$, $0.01 \leq b \leq 0.1$, $0.01 \leq x \leq 0.35$, $0.01 \leq y \leq 0.35$, $0.01 \leq y \leq 0.35$, $0.01 \leq z \leq 0.35$, $0.01 \leq v \leq 0.15$, $0.65 \leq 1-x-y-z-v \leq 0.95$, and X is F or S.

For example, in the composite cathode active material, the lithium metal oxide may be represented by one of Formulae 7 to 10:

$$Li[Ni_{1-x-y}Co_xMn_y]O_2 \qquad \text{Formula 7}$$

wherein $0.01 \leq x \leq 0.35$, $0.01 \leq y \leq 0.35$, and $0.65 \leq 1-x-y \leq 0.95$;

$$Li[Ni_{1-x-y}Co_xAl_y]O_2 \qquad \text{Formula 8}$$

wherein $0.01 \leq x \leq 0.35$, $0.01 \leq y \leq 0.35$, and $0.65 \leq 1-x-y \leq 0.95$;

$$Li[Ni_{1-x-y-z}Co_xMn_yAl_z]O_2 \qquad \text{Formula 9}$$

wherein $0.01 \leq x \leq 0.35$, $0.01 \leq y \leq 0.35$, $0.01 \leq z \leq 0.35$, and $0.65 \leq 1-x-y \leq 0.95$; and $$Li[Ni_{1-x-y-z-v}Co_xMn_yAl_zMg_v]O_2 \qquad \text{Formula 10}$$

wherein $0.01 \leq x \leq 0.35$, $0.01 \leq y \leq 0.35$, $0.01 \leq y \leq 0.35$, $0.01 \leq z \leq 0.35$, $0.01 \leq v \leq 0.15$, and $0.65 \leq 1-x-y-z-v \leq 0.95$.

In some embodiments, the core of the composite cathode active material may be a secondary particle formed from the aggregation of a plurality of primary particles. For example, the lithium metal oxide core may be a secondary particle having a particle diameter of greater than 1 μm formed by the aggregation of a plurality of primary particles, each having a particle diameter of less than 1 μm. A particle diameter of the secondary particle may be about 2 μm to about 50 μm. As shown in the SEM image of FIG. 1, the core including the composite metal oxide is a secondary particle formed by the aggregation of a plurality of primary particles.

In some embodiments, the coating layer of the composite cathode active material may be positioned on (e.g., over) one or more interfaces between the aggregated plurality of primary particles, and may coat a gap between the primary particles. As such, a specific surface area (e.g., regions at gaps between the primary particles that are prone to side reactions with the electrolyte) of the secondary particle surface may be decreased, which may result in suppression or reduction of side reactions between the secondary particle and an electrolyte solution.

In some embodiments, a cathode includes the composite cathode active material and may be manufactured by, for example, mixing the composite cathode active material, a conducting agent, and a binder to prepare a cathode active material composition. In some embodiments, the cathode active material composition may be molded to have a predetermined or set shape. In some embodiments, the cathode active material composition may be coated on a current collector, such as a copper foil or an aluminum foil.

In some embodiments, for example, a composite cathode active material, a conducting agent, a binder, and a solvent may be mixed to prepare a cathode active material composition. In some embodiments, the cathode active material composition may be directly coated on a metallic current collector to prepare a cathode plate. In some embodiments, the cathode active material composition may be cast on a separate support to form a cathode active material film, which may then be separated from the support and laminated on a metallic current collector to prepare a cathode plate. The cathode is not limited to the examples described above, and may be any suitable cathode.

In some embodiments, the cathode may further include a cathode active material used in the related art in addition to the composite cathode active material according to embodiments of the present disclosure.

In some embodiments, the cathode active material used in the related art may include at least one selected from a lithium cobalt oxide, a lithium nickel cobalt manganese oxide, a lithium nickel cobalt aluminum oxide, a lithium iron phosphate, and a lithium manganese oxide, but embodiments are not limited thereto, and any suitable cathode active material available in the art may be additionally used.

In some embodiments, the cathode active material may be a compound represented by one of the following formulae: $Li_aA_{1-b}B'_bD'_2$ (Where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_ani_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aN-i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$.); $Li_aMnG_bO_2$ (where $0.90 \leq a \leq 1.8$ and $0.001 \leq b \leq 0.1$.); $Li_aMn_2G_bO_4$ (where $0.90 \leq a \leq 1.8$ and $0.001 \leq b \leq 0.1$.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as cathode active materials may have or include a surface coating layer (hereinafter, also referred to as "coating layer"). In some embodiments, a mixture of a compound without a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the cathode active material when a compound of the coating element is used. For example, the coating layer may be formed using a spray coating method or a dipping method. The procedures used in such coating methods should be readily apparent to those having ordinary skill in the art, and thus a detailed description thereof will not be provided.

In some embodiments, the cathode active material may be or include $LiCoO_2$, $LiMn_xO_{2x}$ (where x=1 or 2), $LiNi_{1-x}Mn_xO_2$ (where $0<x<1$), $LiNi_{1-x-y}Co_xMn_yO_2$ (where $0 \leq x \leq 0.5$ and $0 \leq y \leq 0.5$), and/or $LiFePO_4$.

Non-limiting examples of the conducting agent may include a carbon-based material (such as acetylene black, Ketjenblack, natural graphite, artificial graphite, carbon black, or carbon fibers); a metal-based material (such as a metal powder or metal fibers of copper, nickel, aluminum, or silver); a conducting material (such as polyphenylene derivatives), or a mixtures of one or more of these materials, but embodiments of the present disclosure are not limited thereto, and any suitable conducting agent available in the art may be used. Also, the crystalline carbonaceous material may be added as a conducting agent.

Non-limiting examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but embodiments of the present disclosure are not limited thereto. Any suitable binder material available in the art may be used.

Non-limiting examples of the solvent may include N-methyl-pyrrolidone, acetone, and water, but embodiments of the present disclosure are not limited thereto. Any suitable solvent available in the art may be used.

The amounts of the cathode active material, the conducting agent, the binder, and the solvent may be similar to those used in lithium batteries in the related art. At least one of the conducting agent, the binder, and the solvent may be omitted, depending on the use and the structure of the lithium battery.

A lithium battery according to embodiments of the present disclosure includes a cathode including the composite cathode active material. The lithium battery may be prepared in the following manner.

First, a cathode may be prepared according to the cathode preparation method described above.

Then, an anode may be prepared according to any suitable anode preparation method.

For example, an anode active material, a conducting agent, a binder, and a solvent may be mixed to prepare an anode active material composition. In some embodiments, the anode active material composition may be directly coated on a metallic current collector (such as a copper foil) to prepare an anode plate. In some embodiments, the anode active material composition may be cast on a separate support to form an anode active material film, which may then be separated from the support and laminated on a current collector (e.g., a copper current collector) to prepare an anode plate. The anode is not limited to the examples described above, and may be one of a variety of types.

In some embodiments, the anode active material may be any suitable anode active material for a lithium battery available in the art. For example, the anode active material may include at least one selected from lithium metal, a metal that is alloyable with lithium, a transition metal oxide, a non-transition metal oxide, and a carbonaceous material.

Non-limiting examples of the metal alloyable with lithium may include silicon (Si), tin (Sn), aluminum (Al), germanium (Ge), lead (Pb), bismuth (Bi), antimony (Sb), a Si—Y alloy (where Y is an alkali metal, an alkali earth metal, a Group XIII element, a Group XIV element excluding Si, a transition metal, a rare earth element, or a combination thereof), and a Sn—Y alloy (where Y is an alkali metal, an alkali earth metal, a Group XIII element, a Group XIV element excluding Sn, a transition metal, a rare earth element, or a combination thereof). In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

Non-limiting examples of the transition metal oxide may include a lithium titanium oxide, a vanadium oxide, and a lithium vanadium oxide.

Non-limiting examples of the non-transition metal oxide may include $SnO_2$ and $SiO_x$ (where $0<x<2$).

Non-limiting examples of the carbonaceous material may include crystalline carbon, amorphous carbon, and mixtures thereof. Non-limiting examples of the crystalline carbon may include graphite (such as natural graphite and/or artificial graphite) having shapeless (amorphous), plate, flake, spherical, or fibrous forms. Non-limiting examples of the amorphous carbon may include soft carbon (carbon sintered at low temperatures), hard carbon, mesophase pitch carbides, and sintered cokes.

In some embodiments, the conducting agent, the binder, and the solvent used for the anode active material composition may each be the same as those used for the cathode active material composition.

In some embodiments, a plasticizer may be further added to the cathode active material composition and/or to the anode active material composition in order to form pores in a corresponding electrode plate (e.g., improve the mechanical strength and stability of the active material on the electrode). The amounts of the anode active material, the conducting agent, the binder, and the solvent may each be similar to the amounts generally used in lithium batteries in the related art. In some embodiments, at least one of the conducting agent, the binder, and the solvent may be omitted, depending on the use and the structure of the lithium battery.

Next, a separator that is positioned between the cathode and the anode is prepared.

In some embodiments, the separator for the lithium battery may be any suitable separator used in lithium batteries in the related art. In some embodiments, the separator may have low resistance to migration of ions in an electrolyte and have an excellent electrolyte-retaining ability. Non-limiting examples of the separator may include glass fiber, polyester, Teflon, polyethylene, polypropylene, polytetrafluoroethylene (PTFE), and a combination thereof, each of which may be a non-woven or woven fabric. In some embodiments, for example, a rollable separator including polyethylene or polypropylene may be used for a lithium ion battery. A separator with a good organic electrolytic solution-retaining ability may be used for a lithium ion polymer battery.

In some embodiments, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator. The polymer resin used to manufacture the separator may be any suitable material available in the art for use as a binder for electrode plates. Non-limiting examples of the polymer resin are a vinylidenefluoride/hexafluoropropylene copolymer, polyvinylidene fluoride (PVDF), polyacrylonitrile, polymethylmethacrylate, and a mixture thereof.

Then, an electrolyte is prepared.

In some embodiments, the electrolyte may be a liquid electrolyte. In some embodiments, the liquid electrolyte may be an organic electrolyte solution.

In some embodiments, the organic electrolyte solution may be prepared by dissolving a lithium salt in an organic solvent. The organic solvent may be any suitable organic solvent available in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof. In some embodiments, the lithium salt may be any suitable lithium salt available in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

In some embodiments, the electrolyte may be a solid electrolyte. Non-limiting examples of the solid electrolyte may include a boron oxide and a lithium oxynitride, but embodiments of the present disclosure are not limited thereto. Any suitable solid electrolyte material available in the art may be used. In some embodiments, the solid electrolyte may be formed on the anode by, for example, sputtering.

Figure 4:
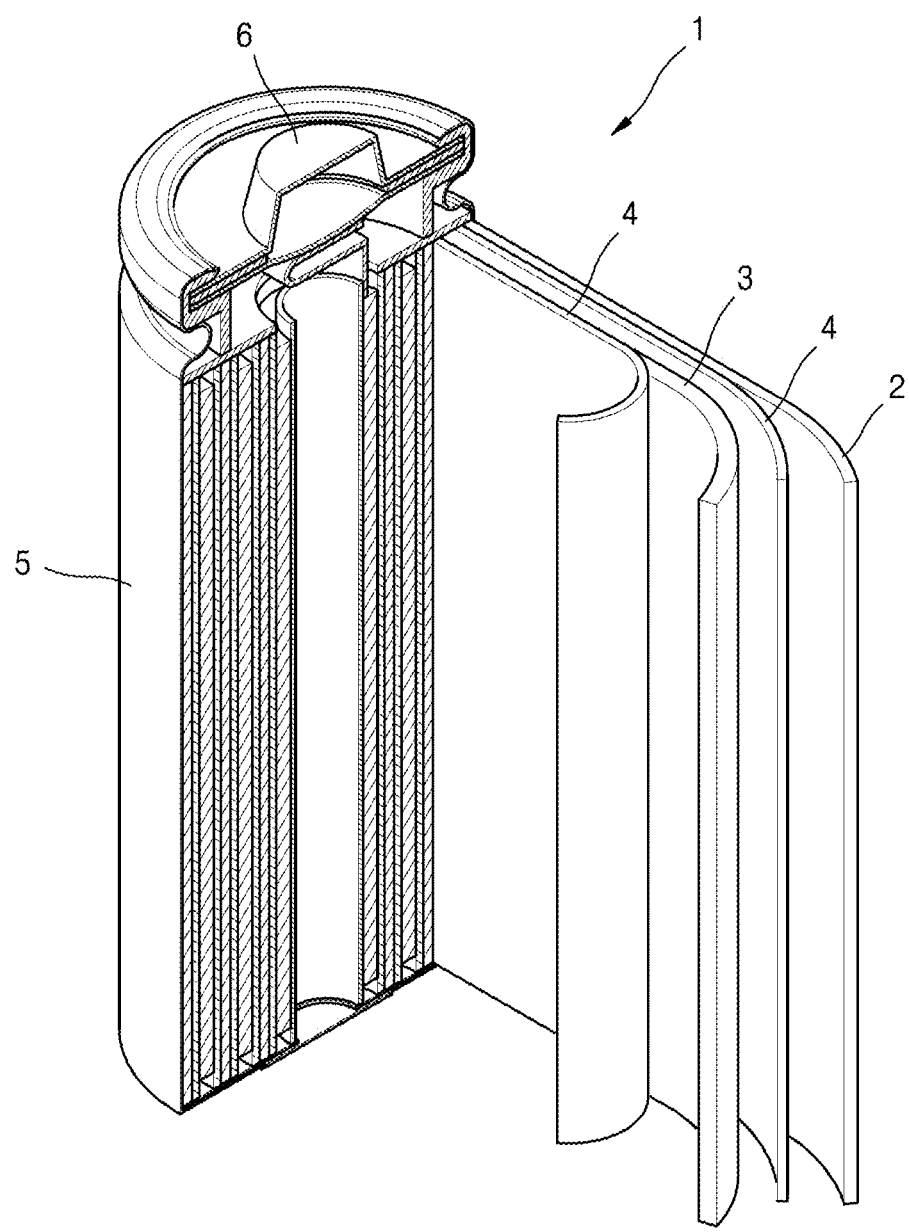
FIG. 4 is a schematic view of a lithium battery according to embodiments of the present disclosure.

Referring to FIG. 4, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type or format, a rectangular type or format, or a thin-film type or format. For example, the lithium battery 1 may be a thin-film type or format battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any suitable device requiring high capacity and high output, for example, in a laptop computer, a smart phone, or an electric vehicle.

The lithium battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool requiring high power output.

Hereinafter, embodiments of the present disclosure will be described by referring to Examples and Comparative Examples. However, the Examples are provided only for purposes of illustration, and are not intended to limit the scope of embodiments of the present disclosure.

(Preparation of Composite Cathode Active Material)

Comparative Example 1

NCA Bare $NiSO_4$, $CoSO_4$, and $Al_2(SO_4)_3$ were dissolved in distilled water at molar ratios of 0.66 mol, 0.22 mol, and 0.06 mol to prepare 2.5 M of a $NiSO_4.xH_2O$ solution (where x is 6 to 7), 2.5 M of a $CoSO_4.xH_2O$ solution (where x is 7), and 2.5 M of a $MnSO_4.H_2O$ solution, respectively. In a reactor, a mixture solution was prepared by mixing the $NiSO_4.xH_2O$ solution (where x is 6 to 7), the $CoSO_4.xH_2O$ solution (where x is 7), and the $MnSO_4.H_2O$ solution. Thereafter, 6 M of a sodium hydroxide aqueous solution and an appropriate or suitable amount of ammonia water was added to the mixture solution in a constant-temperature tub at a temperature of 45° C., stirred at a rate of 600 rpm, and continued stirring at a pH of 11.2 for 8 hours to obtain a co-precipitate. The co-precipitate was washed and dried. $Li_2CO_3$ was mixed with the dried co-precipitate at (or to) a molar ratio of 1:1, and the mixture was heated in an air atmosphere at a temperature increasing rate of 5° C./min from 30° C. until 800° C. Then, the mixture was heat-treated at 800° C. for 10 hours to prepare a cathode active material of $LiNi_{0.66}Co_{0.22}Al_{0.12}O_2$.

Comparative Example 2

NCA Bare Washed Product

The cathode active material prepared in Comparative Example 1 ($LiNi_{0.66}Co_{0.22}Al_{0.12}O_2$) was washed with water twice to remove residual lithium, and thus a cathode active material, $LiNi_{0.66}Co_{0.22}Al_{0.12}O_2$, was prepared.

Comparative Example 3

Washing with HF Aqueous Solution+Heat-Treating

The cathode active material prepared in Comparative Example 1 ($LiNi_{0.66}Co_{0.22}Al_{0.12}O_2$) was mixed with ethanol at (or to) a weight ratio of 1:1 to prepare a mixed solution. A 0.1 wt % HF aqueous solution was added to the mixed solution, which was then stirred at 60° C. for 1 hour to wash the cathode active material. The cathode active material was then separated and dried at room temperature. The dried cathode active material was heat-treated in air at 700° C. for 3 hours to prepare a heat-treated cathode active material.

Example 1

Washing with Electrolyte Solution-Containing Ethanol (0.1 wt % Electrolyte Solution)

The cathode active material prepared in Comparative Example 1 ($LiNi_{0.66}Co_{0.22}Al_{0.12}O_2$) was mixed with ethanol at (or to) a weight ratio of 1:1 to prepare a mixed solution. A 0.1 wt % electrolyte solution was added to the mixture solution, stirred at 60° C. for 1 hour to wash the cathode active material, and then the cathode active material was separated and dried at room temperature.

The electrolyte solution used in the washing process was a mixture of ethylene carbonate (EC), ethyl methyl carbonate (EMC), and dimethyl carbonate (DMC) at a volume ratio of 3:4:3, and included 1.3 M of $LiPF_6$.

A LiF coating layer was formed on a surface of the cathode active material during the washing process.

As shown in the SEM image of FIG. 1, the LiF coating layer is non-continuously formed on a surface of the lithium metal oxide core in the shape of island.

Example 2

Washing with Electrolyte Solution-Containing Ethanol (0.2 wt % Electrolyte Solution)

A cathode active material was prepared in substantially the same manner as in Example 1, except that the amount of the electrolyte solution added to the mixed solution was changed to 0.2 wt %.

Example 3

Washing with Electrolyte Solution-Containing Ethanol (0.1 wt % Electrolyte Solution)+Heat-Treating The cathode active material prepared in Comparative Example 1 ($LiNi_{0.66}Co_{0.22}Al_{0.12}O_2$) was mixed with ethanol at (or to) a weight ratio of 1:1 to prepare a mixed solution. A 0.1 wt % electrolyte solution was added to the mixed solution, stirred at 60° C. for 1 hour to wash the cathode active material, and then the cathode active material was separated and dried at room temperature.

The dried cathode active material was heat-treated in air at 700° C. for 3 hours to prepare a heat-treated cathode active material.

The electrolyte solution was a mixture of EC, EMC, and DMC at a volume ratio of 3:4:3 and included 1.3 M of $LiPF_6$. During the heat-treating process, a composite coating layer including LiF and amorphous carbon was formed on a surface of the cathode active material.

Figure 2:
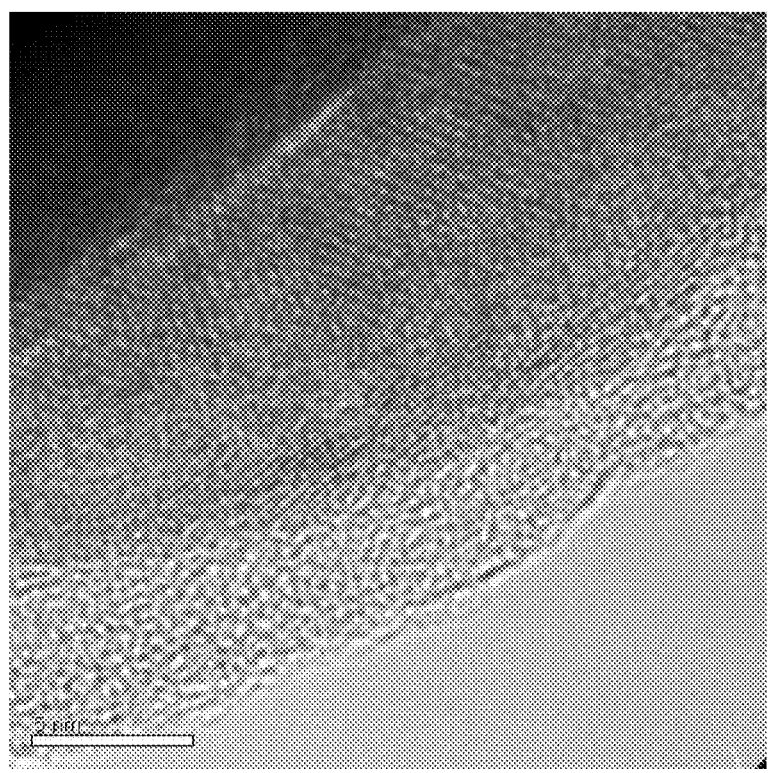
FIG. 2 is a transmission electronic microscope (TEM) image of a surface of a composite cathode active material prepared in Example 3.

FIG. 2 is a transmission electronic microscope (TEM) image of a surface of the composite cathode active material prepared in Example 3. As shown in FIG. 2, the composite coating layer deposited on the lithium transition metal oxide core has a multi-layer structure that includes a first coating layer including LiF and a second coating layer including amorphous carbon. A thickness (e.g., average thickness) of the first coating layer was 12 nm, and a thickness (e.g., average thickness) of the second coating layer was 5 nm.

(Preparation of Cathode and Lithium Battery)

Example 4

5 g of the composite cathode active material prepared in Example 1, 0.15 g of a carbon conducting material (as a conducting material), and 0.15 g of polyvinylidene fluoride, as a binder, were mixed, and 2.5 g of N-methylpyrrolidone was added thereto to prepare a mixture. The mixture was stirred using a mechanical stirrer for 10 minutes to prepare a slurry.

The slurry was coated at or to a thickness of about 200 μm on an aluminum (Al) current collector using a doctor blade, dried in air, and further dried in vacuum at 110° C. to prepare a cathode plate. The cathode plate was roll-pressed into the form of a sheet using a roll press. A coin cell (e.g., CR2016 case) having a diameter of 16 mm was prepared using the cathode plate. A piece of lithium metal was used as a counter electrode, a polyethylene separator (C2320, Celgard®, Charlotte, N.C.) having a thickness of 20 μm was used as a separator, and a mixed solution prepared by dissolving 1.15

M of LiPF$_6$ in a solvent mixture including EC, EMC, and DEC at a volume ratio of 3:4:3 was used as an electrolyte.

Example 5

A cathode and a lithium battery were prepared in substantially the same manner as in Example 4, except that the composite cathode active material powder prepared in Example 2 was used.

Example 6

A cathode and a lithium battery were prepared in substantially the same manner as in Example 4, except that the composite cathode active material powder prepared in Example 3 was used.

Comparative Example 4

A cathode and a lithium battery were prepared in substantially the same manner as in Example 4, except that the composite cathode active material powder prepared in Comparative Example 1 was used.

Comparative Example 5

A cathode and a lithium battery were prepared in substantially the same manner as in Example 4, except that the composite cathode active material powder prepared in Comparative Example 2 was used.

Comparative Example 6

A cathode and a lithium battery were prepared in substantially the same manner as in Example 4, except that the composite cathode active material powder prepared in Comparative Example 3 was used.

Evaluation Example 1

X-Ray Photoelectron Spectroscopy (XPS) Analysis

Figure 3:
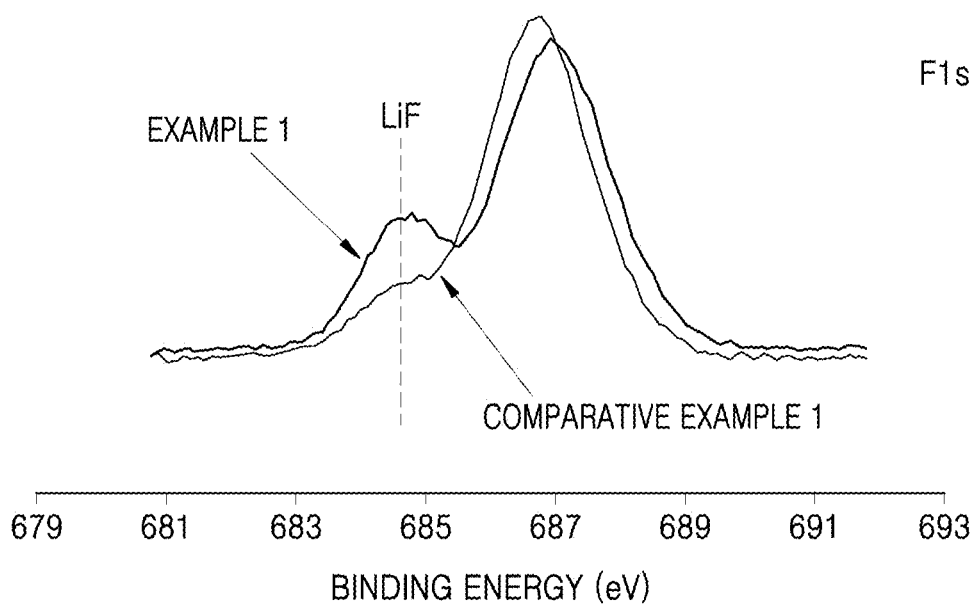
FIG. 3 shows an X-ray photoelectron spectroscopy (XPS) plot of the composite cathode active materials prepared according to Example 1 and Comparative Example 1.

XPS was performed on the composite cathode active material prepared in Comparative Example 1 and the composite cathode active material prepared in Example 1, and the results are shown in FIG. 3.

As shown in FIG. 3, the XPS spectrum of the composite cathode active material of Example 1 included a peak at around 685 eV, corresponding to electron emission from a F 1s orbital derived from LiF. However, the XPS spectrum of the composite cathode active material of Comparative Example 1 did not include the peak.

Therefore, the presence of the coating layer of LiF in the composite cathode active material prepared in Example 1 was confirmed.

Evaluation Example 2

Measurement of Impedance ($R_{ct}$)

Impedances (e.g., AC resistances) of the lithium battery coin cells of Examples 4 to 6 and Comparative Examples 4 to 6 were measured using an impedance analyzer (Material Mates 7260, Milan, Italy) and a 2-probe (e.g., 2 electrode) method using a frequency range of 100 kHz to 10 mHz, a sinus amplitude ($V_a$) of 10 mV, and a pre-measurement waiting period at each frequency ($P_w$) of 0.1 ms. The measured results are shown in Table 1. The measured impedances are charge transfer resistances ($R_{ct}$).

TABLE 1

|  | Impedance [Ω] |
| --- | --- |
| Example 4 | 3.66 |
| Example 5 | 3.83 |
| Example 6 | 3.03 |
| Comparative Example 4 | 4.08 |
| Comparative Example 5 | 4.23 |
| Comparative Example 6 | 3.99 |

As shown in Table 1, the composite cathode active materials of Examples 1 to 3 included in the lithium batteries of Examples 4 to 6 had decreased impedances, compared to those of the composite cathode active materials of Comparative Examples 1 to 3 included in the lithium batteries of Comparative Examples 4 to 6. For example, the lithium battery of Example 6 had further decreased impedance, compared to the lithium batteries of Examples 4 and 5.

The composite cathode active material in the lithium battery of Comparative Example 5 had increased impedance, compared to that of the composite cathode active material in the lithium battery of Comparative Example 4. Without being bound by any particular theory or mechanism, it is believed that this may be a result of washing the composite cathode active material with water in Comparative Example 2.

Since the LiF coating layer on the composite cathode active material in the lithium battery of Comparative Example 6 was formed using an aqueous solution, it is believe that the impedance may have been increased due to excessive elution of lithium ions from the surface of the composite cathode active material during the washing process.

Evaluation Example 3

Charge/Discharge Characteristics Evaluation at Room Temperature (25° C.)

The lithium batteries prepared in Examples 4 to 6 and Comparative Examples 4 to 6 were charged at 25° C. using a constant current-constant voltage (CC-CV) protocol, using a constant current (CC) of 0.1 C up to a voltage of 4.3 V (vs. Li$^+$/Li) and a cut-off current of 0.05 C at 4.3 V in a constant voltage mode (CV). Then, the batteries were discharged at 25° C. using a constant current (CC) at 0.1 C to a discharge voltage of 2.8 V (vs. Li$^+$/Li) (1$^{st}$ cycle of a formation process).

The lithium batteries were subsequently charged at 25° C. with a constant current of 0.2 C up to a voltage of 4.3 V (vs. Li$^+$/Li), followed by a cut-off current of 0.05 C at 4.3 V in CV mode. Then, the batteries were discharged at 25° C. using a constant current of 0.2 C to a discharge voltage of 2.8 V (vs. Li$^+$/Li) (2$^{nd}$ cycle of the formation process).

The lithium batteries were subsequently charged at 25° C. with a constant current of 0.5 C up to a voltage of 4.3 V (vs. Li$^+$/Li), followed by a cut-off current of 0.05 C at 4.3 V in CV mode. Then, the batteries were discharged at 25° C. using a constant current of 0.5 C to a discharge voltage of 2.8 V (vs. Li$^+$/Li), thereby completing the formation process (3$^{rd}$ cycle of the formation process).

After formation, the lithium were subsequently charged at 25° C. with a constant current of 0.1 C up to a voltage of 4.3 V (vs. Li$^+$/Li), followed by a cut-off current of 0.05 C at 4.3

V in CV mode. Then, the batteries were discharged at 25° C. using a constant current of 0.1 C to a discharge voltage of 2.8 V (vs. Li+/Li). The cycles were repeated 50 times.

The lithium batteries were allowed to rest for 10 minutes of retention time after each charging/discharging cycle The charging/discharging test results are shown in Table 2. The capacity retention rate at the 50$^{th}$ cycle is defined as shown in Equation 1:

Capacity retention ratio at 50$^{th}$ cycle [%]=[Discharge capacity at 50$^{th}$ cycle/Discharge capacity at 1$^{st}$ cycle]×100.   Equation 1

TABLE 2

| | Capacity retention ratio at 50$^{th}$ cycle [%] |
|---|---|
| Example 4 | 97.2 |
| Example 5 | 94.3 |
| Example 6 | 98.8 |
| Comparative Example 4 | 91.6 |
| Comparative Example 5 | 89.6 |
| Comparative Example 6 | 92.1 |

As shown in Table 2, the lifespan characteristics of the lithium batteries of Examples 4 to 6 were significantly improved, compared to the lithium batteries of Comparative Examples 4 to 6.

Evaluation Example 4

60° C. High-Temperature Stability Test

In the 1$^{st}$ cycle, lithium batteries prepared in Examples 4 to 6 and Comparative Examples 4 to 6 were charged at 25° C. with a CC of 0.5 C up to a voltage of 4.3 V, charged at a CV using a cut-off current of 0.05 C at 4.3 V, and then discharged with a CC at 0.5 C to a discharge voltage of 2.8 V.

In the 2$^{nd}$ cycle, the lithium batteries were charged with a CC at 0.5 C up to a voltage of 4.3 V, charged at a CV using a cut-off current of 0.05 C at 4.3 V, and then discharged with a CC at 0.2 C to a discharge voltage of 2.8 V.

In the 3$^{rd}$ cycle, the lithium batteries were charged with a CC at 0.5 C up to a voltage of 4.3 V, charged at a CV using a cut-off current of 0.05 C at 4.3 V, and then discharged with a CC at 0.2 C to a discharge voltage of 2.8 V. The discharge capacity at the end of the 3$^{rd}$ cycle was used as the standard (e.g., baseline) capacity.

In the 4$^{th}$ cycle, the lithium batteries were charged with a CC at 0.5 C up to a voltage of 4.3 V and were subsequently charged at a CV using a cut-off current of 0.05 C at 4.3 V. Thereafter, the charged batteries were stored in a 60° C. oven for 7 days. The batteries were taken out of the oven and were discharged with a CC at 0.1 C until a discharge voltage of 2.8 V. Selected charge/discharge results are shown in Table 3. The capacity retention rate after the high-temperature storage is defined as shown in Equation 2:

Capacity retention ratio after storage at high-temperature [%]=[Discharge capacity at 4$^{th}$ cycle after storage at high-temperature/Standard capacity]×100.   Equation 2

(The standard capacity is the 3$^{rd}$ cycle discharge capacity.)

TABLE 3

| | Capacity retention ratio after storage for 7 days [%] |
|---|---|
| Example 4 | 92.1 |
| Example 5 | 90.1 |
| Example 6 | 95.3 |
| Comparative Example 4 | 88.5 |
| Comparative Example 5 | 85.4 |
| Comparative Example 6 | 90.0 |

As shown in Table 3, the lithium batteries of Examples 4 to 6 exhibited significantly increased high-temperature stability compared to the lithium batteries of Comparative Examples 4 to 6.

As described above, according to one or more embodiments of the present disclosure, the lifespan characteristics and high-temperature storage stability of lithium batteries including a composite cathode active material may be improved by including the composite cathode active material having a reduced resistance despite having a LiF-containing coating layer.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as being available for other similar features or aspects in other embodiments.

While one or more example embodiments have been described with reference to the drawings, it will be understood by those of ordinary skill in the art that various changes in form and details may be made therein without departing from the spirit and scope of the present disclosure as defined by the following claims and equivalents thereof.

What is claimed is:

1. A method for preparing a composite cathode active material, the method comprising:
preparing an electrolyte solution comprising a fluorine-containing lithium salt and a non-aqueous solvent;

preparing a coating mixture by mixing a lithium metal oxide, an alcohol, and the electrolyte solution;

separating the lithium metal oxide from the coating mixture to obtain a pre-coated lithium metal oxide; and drying the pre-coated lithium metal oxide.

2. The method for preparing the composite cathode active material of claim 1, wherein the alcohol is a linear or branched $C_1$-$C_{10}$ alcohol.

3. The method for preparing the composite cathode active material of claim 1, wherein the mixing the lithium metal oxide, the alcohol, and the electrolyte solution is performed at a temperature of 10° C. to 70° C.

4. The method for preparing the composite cathode active material of claim 1, wherein the fluorine-containing lithium salt is at least one selected from $LiPF_6$, $LiBF_4$, $LiSbF_6$, and $LiAsF_6$.

5. The method for preparing the composite cathode active material of claim 1, wherein the non-aqueous solvent is at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, and dimethyl ether.

6. The method for preparing the composite cathode active material of claim 1, further comprising heat-treating the pre-coated lithium metal oxide.

7. The method for preparing the composite cathode active material of claim 6, wherein the heat-treating is performed at a temperature of 400° C. to about 800° C. for 1 to 15 hours.

8. The method for preparing the composite cathode active material of claim 1, wherein the composite cathode active material comprises:

a core comprising the lithium metal oxide; and a coating layer on the core, the lithium metal oxide including two or more transition metals including nickel (Ni), an amount of Ni in one mole of the two or more transition metals being about 0.65 mol or greater, and the coating layer comprising LiF.

9. The method for preparing the composite cathode active material of claim 8, wherein a resistance of the composite cathode active material is lower than that of the core.

10. The method for preparing the composite cathode active material of claim 8, wherein the coating layer further comprises a carbonaceous material.

11. The method for preparing the composite cathode active material of claim 8, wherein the coating layer further comprises amorphous carbon.

12. The method for preparing the composite cathode active material of claim 8, wherein the coating layer comprises LiF and a carbonaceous material in a single layer.

13. The method for preparing the composite cathode active material of claim 8, wherein the coating layer has a multi-layer structure comprising a first coating layer and a second coating layer, the first coating layer comprising the LiF and the second coating layer comprising a carbonaceous material.

14. The method for preparing the composite cathode active material of claim 8, wherein the coating layer is discontinuously disposed on the core.

15. The method for preparing the composite cathode active material of claim 13, wherein the coating layer completely covers the core.

16. The method for preparing the composite cathode active material of claim 8, wherein a thickness of the coating layer is about 2 nm to about 500 nm.

17. The method for preparing the composite cathode active material of claim 13, wherein a thickness of the second coating layer is about 1 nm to about 100 nm.

18. The method for preparing the composite cathode active material of claim 1, wherein the lithium metal oxide is represented by Formula 1:

$$Li_{1+a}[Ni_{1-x}M_x]O_{2-b}X_b \qquad \text{Formula 1}$$

wherein, in Formula 1, $0 \leq a \leq 0.2$, $0.01 \leq b \leq 0.1$, $0.01 \leq x \leq 0.35$;

M is at least one selected from Al, Co, Mn, Mg, Zn, Fe, Cr, Ga, Mo, W, Ti, Sc, V, Cr, Fe, B, Si, Ga, Ge, As, Zr, Ru, Rh, Pt, Ag, and Sn; and X is F or S.

19. The method for preparing the composite cathode active material of claim 1, wherein the lithium metal oxide is represented by Formula 2:

$$Li_{1+a}[Ni_{1-x-y}Co_xM'_y]O_{2-b}X_b \qquad \text{Formula 2}$$

wherein, in Formula 2, $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$;

M is at least one selected from Al, Mn, Mg, Zn, Fe, Cr, Ga, Mo, W, Ti, Sc, V, Cr, Fe, B, Si, Ga, Ge, As, Zr, Ru, Rh, Pt, Ag, and Sn; and X is F or S.

20. The method for preparing the composite cathode active material of claim 1, wherein the lithium metal oxide is represented by one selected from Formulae 3 to 6:

$$Li_{1+a}[Ni_{1-x-y}Co_xMn_y]O_{2-b}X_b \qquad \text{Formula 3}$$

wherein, in Formula 3, $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$; and X is F or S;

$$Li_{1+a}[Ni_{1-x-y}Co_xAl_y]O_{2-b}X_b \qquad \text{Formula 4}$$

wherein, in Formula 4, $0 \leq a \leq 0.2$, $0.01 \leq b \leq 0.1$, $0.01 \leq x \leq 0.35$, $0.01 \leq y \leq 0.35$, $0.65 \leq 1-x-y \leq 0.95$; and X is F or S;

$$Li_{1+a}[Ni_{1-x-y-z}Co_xMn_yAl_z]O_{2-b}X_b \qquad \text{Formula 5}$$

wherein, in Formula 5, $0 \leq a \leq 0.2$, $0.01 \leq b \leq 0.1$, $0.01 \leq x \leq 0.35$, $0.01 \leq y \leq 0.35$, $0.01 \leq z \leq 0.35$, $0.65 \leq 1-x-y-z \leq 0.95$; and X is F or S;

$$Li_{1+a}[Ni_{1-x-y-z-v}Co_xMn_yAl_zMg_v]O_{2-b}X_b \qquad \text{Formula 6}$$

wherein, in Formula 6, $0 \leq a \leq 0.2$, $0.01 \leq b \leq 0.1$, $0.01 \leq x \leq 0.35$, $0.01 \leq y \leq 0.35$, $0.01 \leq y \leq 0.35$, $0.01 \leq z \leq 0.35$, $0.01 \leq v \leq 0.15$, $0.65 \leq 1-x-y-z-v \leq 0.95$, and X is F or S.

21. The method for preparing the composite cathode active material of claim 8, wherein the core is a secondary particle comprising a plurality of aggregated primary particles.

22. A cathode comprising the composite cathode active material prepared by the method of claim 1.

23. A lithium battery comprising the cathode of claim 22.

* * * * *